United States Patent
Benninghofen et al.

(10) Patent No.: US 9,927,513 B2
(45) Date of Patent: Mar. 27, 2018

(54) METHOD FOR DETERMINING THE GEOGRAPHIC COORDINATES OF PIXELS IN SAR IMAGES

(75) Inventors: Benjamin Benninghofen, Riemerling (DE); Tamer Koban, Neustadt (DE); Christoph Stahl, Geisenfeld (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 1673 days.

(21) Appl. No.: 13/380,397

(22) PCT Filed: Jun. 16, 2010

(86) PCT No.: PCT/DE2010/000683
§ 371 (c)(1),
(2), (4) Date: Jan. 25, 2012

(87) PCT Pub. No.: WO2010/149132
PCT Pub. Date: Dec. 29, 2010

(65) Prior Publication Data
US 2012/0133550 A1 May 31, 2012

(30) Foreign Application Priority Data
Jun. 25, 2009 (DE) .................. 10 2009 030 672

(51) Int. Cl.
*G01S 7/295* (2006.01)
*G01S 13/90* (2006.01)
*G09B 29/10* (2006.01)

(52) U.S. Cl.
CPC .............. *G01S 7/295* (2013.01); *G01S 13/90* (2013.01); *G09B 29/10* (2013.01)

(58) Field of Classification Search
CPC ...... G01S 13/9035; G01S 7/295; G01S 13/90; G09B 29/10
(Continued)

(56) References Cited

U.S. PATENT DOCUMENTS 5,659,318 A * 8/1997 Madsen et al. ............. 342/25 C
6,011,505 A * 1/2000 Poehler et al. ............. 342/25 C
(Continued)

OTHER PUBLICATIONS

International Preliminary Report on Patentability (Form PCT/IB/373 (one (1) page) with English translation of Written Opinion of the International Searching Authority (Form PCT/ISA/237 (seven (7) pages), which was issued for PCT/DE2010/000683.
(Continued)

*Primary Examiner* — Frank J McGue
(74) *Attorney, Agent, or Firm* — Crowell & Moring LLP

(57) ABSTRACT

A method for effecting the airborne determination of geographic coordinates of corresponding pixels from digital synthetic aperture radar images, where the SAR images are available in the form of slant range images and the recording position of the respective SAR image is known. The coordinates of the corresponding pixels in the SAR images and the corresponding range gates are used in each case to determine the distance between a corresponding resolution cell on the ground and the respective recording position of the respective SAR image. The determined distances and associated recording positions of the SAR images are used to determine the geographic coordinates of the corresponding pixels in the SAR images by employing a WGS84 ellipsoid.

4 Claims, 4 Drawing Sheets

(58) Field of Classification Search
USPC .................................................... 342/25 A
See application file for complete search history.

(56) References Cited

U.S. PATENT DOCUMENTS

2003/0154060 A1* 8/2003 Damron ........................... 703/2
2011/0098986 A1* 4/2011 Fernandes Rodrigues
　　　　　　　　　　　　et al. .............................. 703/1

OTHER PUBLICATIONS

English-language translation of claims 1-4 pending in EP 2 446 298, which is a National stage application of PCT/DE2010/000683.
Corresponding International Search Report with English Translation dated Oct. 4, 2010 (seven (7) pages).
Form PCT/ISA/237 (eight (8) pages).
Giovanni Nicco, "Exact Closed-Form Geolocation for SAR Interferometry", IEEE Transactions on Geoscience and Remote Sensing, Jan. 2002, vol. 40, No. 1, (three (3) pages), XP011021925.

Harold A. Malliot, "Geocoding the DTEMS Digital Terrain Matrix and Radar Image Products", Aerospace Conference, 1997, pp. 35-47, XP010214686.
G. Schreier et al., "Parameters for Geometric Fidelity of Geocoded SAR Products", May 20, 1990, pp. 305-308, XP010001783.
Alexander Loew et al., Generation of Geometrically and Radiometrically Terrain Corrected SAR Image Products, Remote Sensing of Environment, Elsevier, 2007, pp. 337-349, vol. 106, Elsevier Inc., XP005856426.
O. Mora et al., "Direct Geocoding for Generation of Precise Wide-Area Elevation Models with ERS SAR Data", Advancing ERS SAR Interferometry from Applications Towards Operations, Nov. 12, 1999, (seven (7) pages), XP007915030.
Achim Roth et al., "Standard Geocoded Ellipsoid Corrected Images", SAR Geocoding: Data and Systems, 1993, pp. 159-172, XP007915046.
E. Meir et al., "Precise Terrain Corrected Geocoded Images", Gunter Schreier ED., SAR Geocoding: Data and Systems, 1993, pp. 173-185, XP007915045.

\* cited by examiner

METHOD FOR DETERMINING THE GEOGRAPHIC COORDINATES OF PIXELS IN SAR IMAGES

CROSS-REFERENCE TO RELATED APPLICATIONS

The present application claims priority under 35 U.S.C. § 119 to German Patent Application No. 10 2009 030 672.2, filed Jun. 25, 2009, the entire disclosure of which is herein expressly incorporated by reference.

BACKGROUND AND SUMMARY OF THE INVENTION

Exemplary embodiments of the present invention are directed to a method for determining the geographic coordinates of pixels in SAR images.

Using SAR image to determine the position of a target at great distances (20 km-100 km) is frequently imprecise due to the errors in the SAR images. The errors in the SAR images typically result from azimuth errors and distortion effects. (foreshortening, layover).

U.S. Pat. No. 5,659,318 A discloses an interferometric method in which images of a target region generated using two spatially separated SAR antennas are analyzed in terms of their phase difference, and the recording position of the SAR images is known.

The known approach to coordinate determination of a target from an SAR image will be explained first:

The basis for this is what is called a WGS84 ellipsoid. The World Geodetic System 1984 (WGS 84) is a geodetic reference system forming the uniform foundation for positional information on the earth or near-earth space. It is composed of
- a simple three-dimensional reference surface, the reference ellipsoid that is roughly matched to the surface of the earth;
- a more detailed model for the shape of the earth that deviates from this idealized shape, the so-called geoid;
- twelve fundamental stations distributed across the earth, through which the relationship between these models and the earth's crust is defined by providing (time-dependent) coordinates (the so-called reference frame).

The system is the geodetic foundation of the Global Positioning Systems (GPS) that enables appropriate satellites (NAVSTAR satellites) to survey the earth and provide orientation.

The key parameters in an SAR are defined in FIGS. 1a and 1b. A typical SAR configuration is illustrated in FIG. 1a. The sensor platform, e.g., an aircraft, is moving at altitude h above the ground at velocity v along the X axis. The radar illuminates sideways a region on the ground. The optimum viewing direction for an SAR is 90° relative to the direction of velocity vector v. Viewing directions that deviate from the optimum viewing direction negatively affect the resolution and the cost/complexity of SAR image generation. The size of the radar antenna corresponds to the real aperture. This size is kept relatively small to allow the radar antenna to be carried on the sensor platform. However, the size of the antenna, or the aperture, determines the resolution. The larger the antenna, the better the resolution. In order to achieve high resolution despite the small antenna, a large antenna is generated artificially. This occurs by having the sensor platform fly along the aperture of an imaginary large antenna and collecting the reflected radar pulses at each section of the imaginary large antenna. The sensor platform must in other words fly the length of a synthetic aperture in order to collect the data for an SAR image.

The key SAR parameters are illustrated more precisely in FIG. 1b. The term S denotes the position of the sensor platform, while the vector v denotes the associated velocity. The coordinate system is chosen so that v points along positive axis X. Point T is mapped to the center of the SAR image. The straight line LOS (line of sight) denotes the connecting line between position S of the sensor platform and point T. The length of straight-line LOS corresponds to the range gate R of the SAR. The projection of velocity vector onto straight line LOS yields the radial approach velocity $v_r$ of the sensor platform toward point T. The angle $\Psi$ between velocity vector v and straight line LOS is designated here as the squint angle. Projection of straight line LOS onto a plane that runs through point S and is parallel to the XY plane produces the straight line HLOS (horizontal line of sight). The angle $\epsilon$ between LOS and HLOS is called the elevation angle.

In order to effect a typical determination of coordinates for a target from an SAR image, the coordinate of the center of the SAR image is determined first. The coordinate of a pixel on the SAR image that has been recognized as the target is then computed. The SAR parameters introduced above are used to determine the coordinates of the image center.

The relevant parameters for the typical coordinate determination of a target from an SAR image are illustrated in FIG. 2a. Sensor platform S is located at altitude H above the WGS84 ellipsoid, which is represented here in a highly enlarged manner as a plane. Together with the squint angle $\Psi$ and the distance R (range gate) to the image center, velocity vector v defines a cone. This cone determines the SAR configuration. The base of the cone defines a circle of radius $r=R \sin(\Psi)$. The geographic coordinate of the SAR image center is located at the intersection between this circle and the surface of the earth. There are two points on the graph where the circle intersects the surface of the earth. Since, however, it is known in which direction the SAR sensor is looking, one intersection point can obviously be excluded.

Once the geographic coordinate $P_0$ of the SAR image center has been computed, the geographic coordinate of a pixel recognized as the target can be calculated on the SAR image. FIG. 2b outlines the key parameters here. To this end, the local tangential vectors $n_r$ and $n_{cr}$ normalized to one on the WGS84 ellipsoid are calculated at point $P_0$. Since the pixel coordinates $p_x$ and $p_y$ are known relative to the SAR image center, the known resolutions $\delta_x$ and $\delta_y$ can be used to calculate the displacement vector d from point $P_0$ to the point that corresponds to the pixel, as follows:

$$\vec{d} = \delta_x p_x \vec{n}_{cr} + \delta_y p_y \vec{n}_r$$

Simple vector addition can then be used to calculate the geographic coordinate of the target pixel from the geographic coordinates of image center $P_0$ and displacement vector d. Calculation of the geographic coordinates of the point that corresponds to the pixel is prior-art knowledge and is familiar to a person skilled in the art.

In the determination of coordinates for a target from an SAR image using the approach familiar from prior art, the above-described cone contributes to determining the coordinates of the target. However, the position of this cone in space is determined relative to the velocity vector. If this velocity vector is not known precisely, then an error results in the coordinate determination. In typical SAR systems, this error can amount to up to 100 meters in the azimuth direction, the direction of the velocity vector. In addition, the assumption is made based on the determination of the geographic coordinates of the image center that the target plane is flat. However, SAR produces typical effects such as foreshortening or layover, a displacement of the pixel corresponding to the target point, and this results in an additional error in the calculation of the displacement vector to the target.

Exemplary embodiments of the present invention provide a method by which the error in the position determination can be reduced.

According to the invention, the coordinates of the corresponding pixels in the SAR images and the corresponding range gates are used to determine in each case the distance between a corresponding resolution cell on the ground and the respective recording position of the respective SAR image, and the determined distances and associated recording positions for the SAR images are used to determine the geographic coordinates of the corresponding pixels in the SAR images by employing an WGS84 ellipsoid.

BRIEF DESCRIPTION OF THE DRAWING FIGURES

The invention as well as advantageous embodiments of the method according to the invention are described in more detail below based on the figures. Here:

Figure 5:
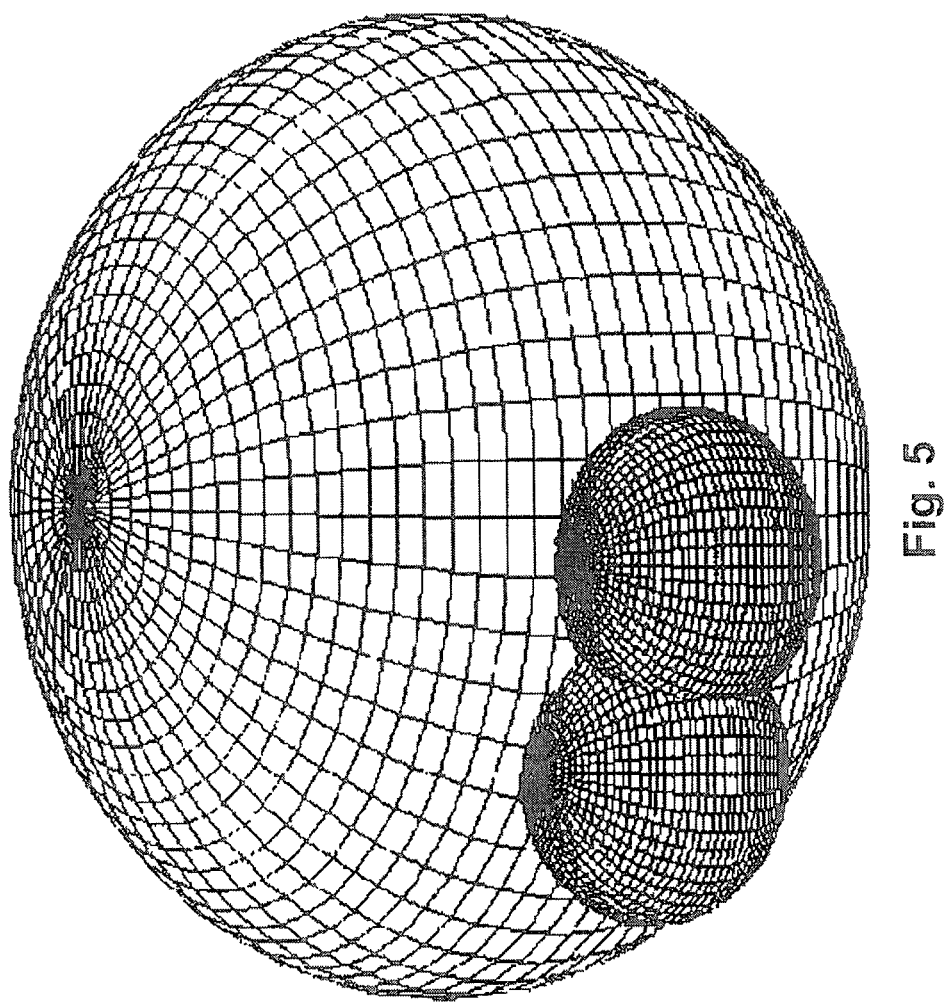

FIG. 5 a schematic diagram illustrating the principle of coordinate determination of a target from three SAR images as set forth in the invention.

DETAILED DESCRIPTION

Obtaining distance information from an SAR image proceeds as follows. In an SAR system, the range gate is set for the generation of images. This range gate determines the distance between the SAR sensor and the resolution cell on the ground that corresponds to the center of the SAR slant range image. Hereafter this pixel is identified as the center pixel. Once a pixel has been determined as the target, the distance to the resolution cell on the ground corresponding to the pixel can be calculated. This is illustrated in FIG. 3.

Figure 3:
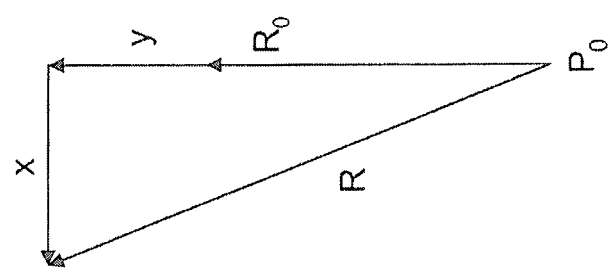
FIG. 3 is a schematic diagram illustrating the distance determination of a pixel from an SAR image.

The range gate is denoted in FIG. 3 as $R_0$. The distance to the target pixel is denoted by R. If the pixel coordinates x and y of the target pixel are provided relative to the center pixel, the distance R to this pixel can be computed, as follows $$R = \sqrt{(\delta_x x)^2 + (\delta_y y + R_0)^2} \tag{1}$$

The parameters $\delta_x$ and $\delta_y$ denote the resolution of the SAR slant range image in the azimuth direction or the resolution in the range direction.

The following discussion is aimed at describing the coordinate determination of a target using two SAR images. If only two SAR images are available, it is possible to extract two distance measurements to the resolution cell on the ground from the SAR slant range images. However, two distance measurements are not sufficient by themselves to effect a determination of coordinates. With this method, the additional assumption must therefore be made that the target is located on the WGS84 ellipsoid. This principle is sketched in FIG. 5. The distances to the target and the associated positions from which the distances have been measured are used to produce two spheres. The target has the property of being located on the surface of the two spheres and of the WGS84 ellipsoid. The problem thus consists in computing the intersection of the three surfaces. The intersection of two spheres is generally a circular line in space. The intersection of this circular line with the WGS84 ellipsoid generally consists of two points. One point can be excluded from consideration for reasons of plausibility since the two points usually lie far apart. Since, however, the approximate viewing direction for recording the SAR image is known, one point can be rejected as a solution. If the mean altitude in the target region is known, this altitude can be utilized to correct the position of the resolution cell on the ground that corresponds to the target pixel.

The problem is described by the following two equations 2 and 3. The terms x, y, and z denote the sought coordinates of the target. The same parameters with the subscripts 1 and 2 denote the coordinates of the two SAR image recording positions. The two associated distances to the target are denoted by $R_1$ and $R_2$. The semi-axes of the WGS84 ellipsoid are denoted by a and b. Equation 3 thus describes the fact that the target is located on the WGS84 ellipsoid.

$$(x-x_1)^2 + (y-y_1)^2 + (z-z_1)^2 = R_1^2 \tag{2}$$
$$(x-x_2)^2 + (y-y_2)^2 + (z-z_2)^2 = R_2^2$$

$$\frac{x^2}{a^2} + \frac{y^2}{a^2} + \frac{z^2}{b^2} = 1 \tag{3}$$

Coordinate Determination Using Three SAR Images

Figure 1B:
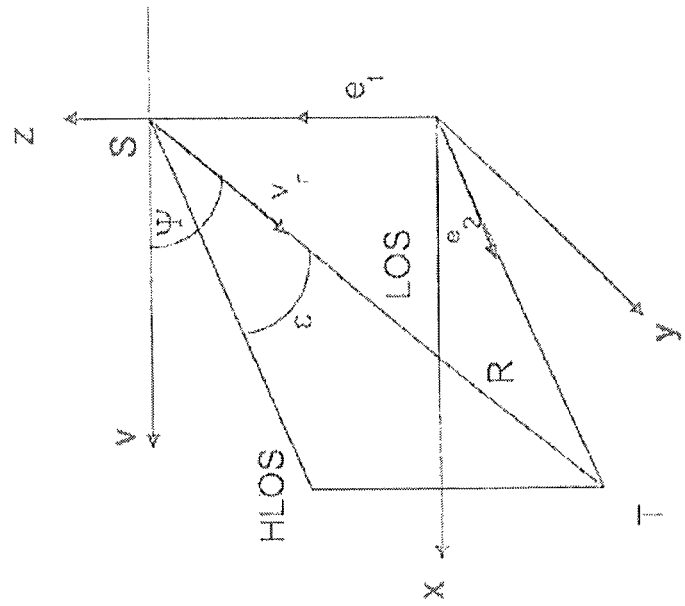
FIGS. 1a and 1b are schematic diagrams illustrating the principle of SAR.
Figure 1A:
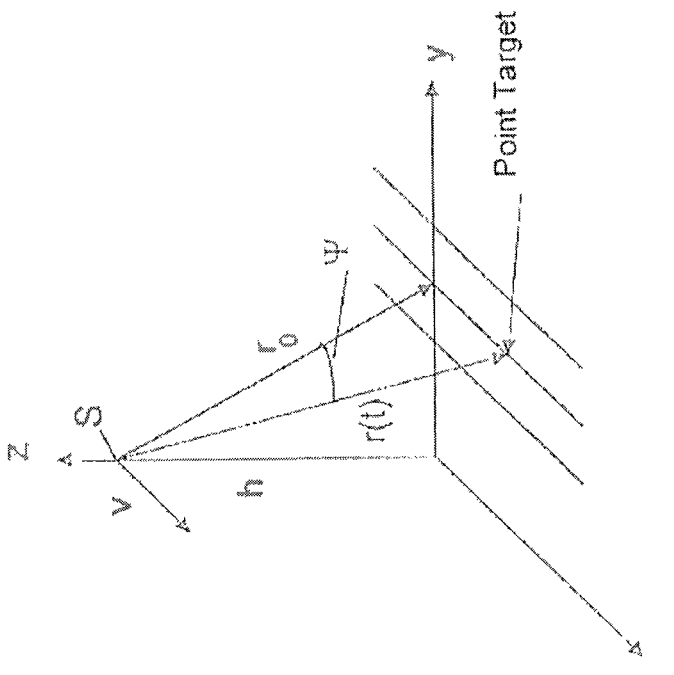
Figures 2A, 2B:
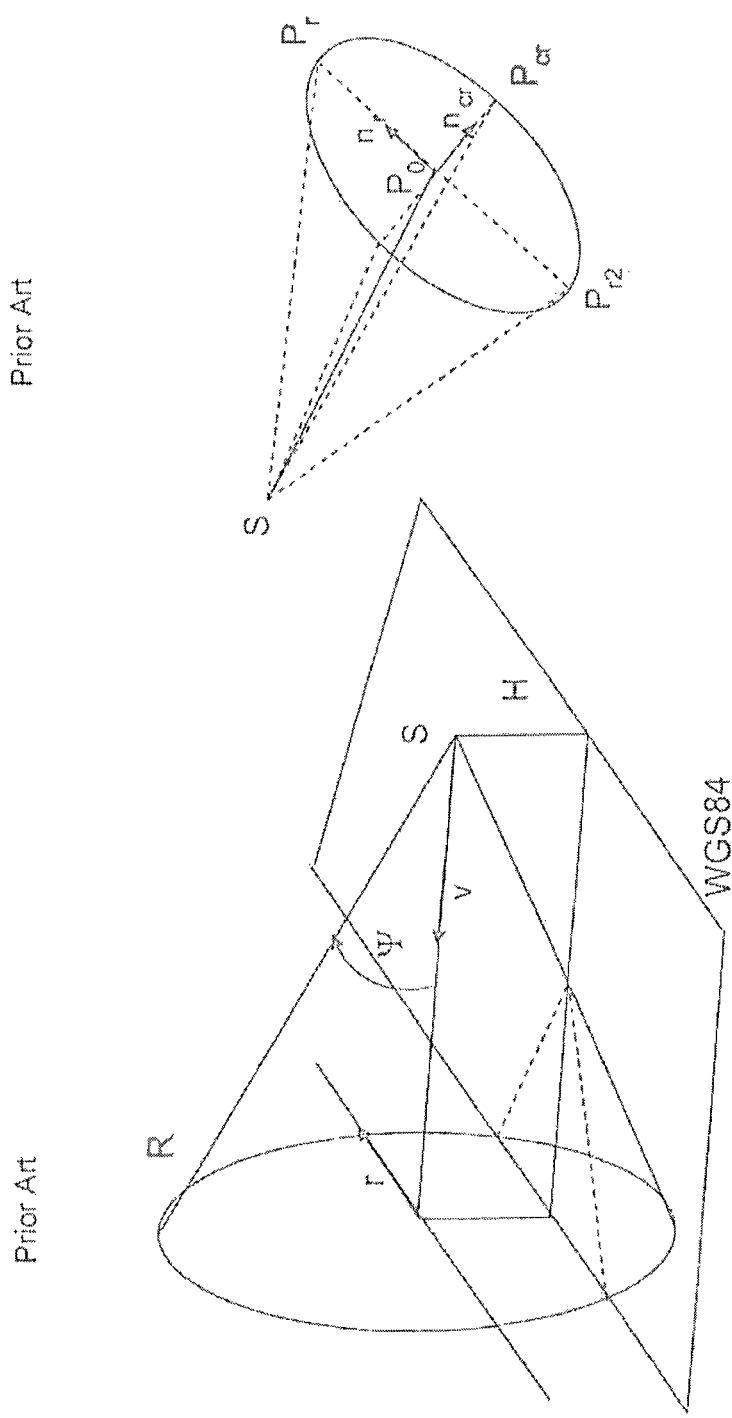
FIGS. 2a and 2b are schematic diagrams illustrating the coordinate determination of a target from an SAR image as known in prior art.
Figure 4:
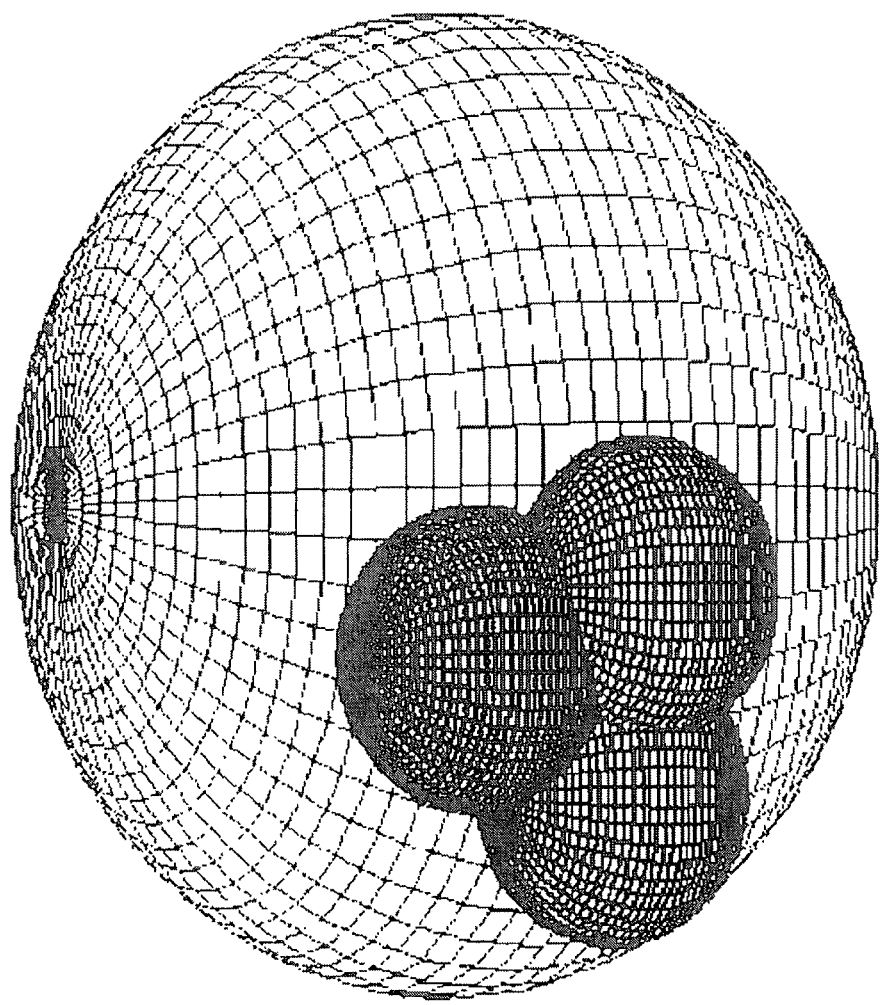
FIG. 4 is a schematic diagram illustrating the principle of coordinate determination of a target from two SAR images as set forth in the invention.

The following discussion now describes coordinate determination using three SAR images. In order to determine the coordinates of a target using three SAR images, the distance information to the target obtained from the SAR images is employed to compute the coordinates. The principle is illustrated in FIG. 4. The three distances to the target and the associated positions from which the distances were measured are used to produce three spheres. The target has the property of being located on the surface of the three spheres. The problem thus consists in computing the intersection of the three spheres. The intersection of two spheres is generally a circular line in space. The intersection of this circular line with the third sphere generally consists of two points. One point can usually be excluded from consideration for reasons of plausibility. The geometry of the coordinate determination determines the fact that one point lies on the surface of the earth while the second one is on the other hand located far above the earth's surface. The point located far above the earth's surface can be excluded as a solution since the target is located on the ground.

The problem is described by the following equation 4:

$$(x-x_1)^2 + (y-y_1)^2 + (z-z_1)^2 = R_1^2$$
$$(x-x_2)^2 + (y-y_2)^2 + (z-z_2)^2 = R_2^2$$
$$(x-x_3)^2 + (y-y_3)^2 + (z-z_3)^2 = R_3^2 \tag{4}$$

The terms x, y, and z here represent the sought coordinates of the target. The same parameters with the subscripts by 1, 2, and 3 denote the coordinates of the three SAR image recording positions. The three associated distances to the target are denoted by R1, R2, and R3.

The disclosed method can be performed by a processor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method, comprising:
   determining, by a processor of an airborne device, geographic coordinates of corresponding pixels of a target from first and second digital synthetic aperture radar (SAR) images by
      capturing, by the processor of the airborne device, the first and second SAR images in a form of slant range images;
      determining, by the processor of the airborne device, a recording position of the respective first and second SAR images;
      determining, by the processor of the airborne device, a distance between a corresponding resolution cell on a ground and the respective recording position of the respective first and second SAR images using coordinates of the corresponding pixels of the target in the first and second SAR images and corresponding range gates; and
      determining, by the processor of the airborne device using the determined distances and associated recording positions of the first and second SAR images, the geographic coordinates of the corresponding pixels of the target in the first and second SAR images by
         producing, by the processor of the airborne device, a first and second sphere for the first and second SAR images using the determined distances and associated recording positions of the first and second SAR images; and
         determining, by the processor of the airborne device, the geographic coordinates of the corresponding pixels of the target as a common intersection of the first and second spheres with the WGS84 ellipsoid.

2. The method according to claim 1, wherein a mean altitude of a target region that is predefined for an SAR image is used to determine the geographic coordinates of corresponding pixels of the target.

3. The method according to claim 1, wherein a relief map that is predefined for an SAR image is used to determine the geographic coordinates of corresponding pixels of the target.

4. The method according to claim 1, wherein two or three SAR images are used to determine the geographic coordinates of corresponding pixels of the target from digital synthetic aperture radar images.

* * * * *